United States Patent [19]

Starck

[11] Patent Number: 4,607,281

[45] Date of Patent: Aug. 19, 1986

[54] METHOD AND CIRCUIT ARRANGEMENT FOR THE IMPROVEMENT OF THE PICTURE QUALITY BY ACTIVITY-CONTROLLED DPCM CODING

[75] Inventor: Alexander Starck, Munich, Fed. Rep. of Germany

[73] Assignee: Siemens Aktiengesellschaft, Berlin & Munich, Fed. Rep. of Germany

[21] Appl. No.: 651,626

[22] Filed: Sep. 17, 1984

[30] Foreign Application Priority Data

Sep. 15, 1983 [DE] Fed. Rep. of Germany ....... 3333404

[51] Int. Cl.[4] ............................................. H04N 7/137
[52] U.S. Cl. ........................................ 358/136; 375/33
[58] Field of Search ............... 358/133, 135, 136, 138; 375/29, 31, 33

[56] References Cited

U.S. PATENT DOCUMENTS

| | | | |
|---|---|---|---|
| 4,144,543 | 3/1979 | Koga | 358/136 |
| 4,371,895 | 2/1983 | Koga | 358/136 |
| 4,437,119 | 3/1984 | Matsumoto | 358/136 |
| 4,460,923 | 7/1984 | Hirano | 358/136 |
| 4,488,174 | 12/1984 | Mitchell | 358/136 |
| 4,494,140 | 1/1985 | Michael | 358/136 |

FOREIGN PATENT DOCUMENTS 2102652 2/1983 United Kingdom .

OTHER PUBLICATIONS

Pirsch, P., "Adaptive Intra-Interframe DPCM Coder", The Bell System Technical Journal, vol. 61, No. 5, May-Jun. 1982, pp. 747-764.

"Standards for Televisions Systems Using Digital Modulation", CCIR Study Groups, 1978-1982, Doc. 11, Doc. CMTT pp. 1-9.

Primary Examiner—Howard W. Britton
Attorney, Agent, or Firm—Hill, Van Santen, Steadman & Simpson

[57] ABSTRACT

A method for improving picture quality given DPCM coded television signals provides for the determination of an activity criterion from the video values of the same television field which surround a current sample and the video signal values of the preceding television field by calculation of the intensity differences between the video signal values. The estimated value is determined from the video signal values of the most recent television field, from the video signal values of the most recent and current television fields, or only from the video signal values of the current television fields, as a function of two thresholds.

10 Claims, 5 Drawing Figures

```
    - K L M - -
    - B C D - -
    - H I J - -
    - A X - - -
    - E F G - -
```

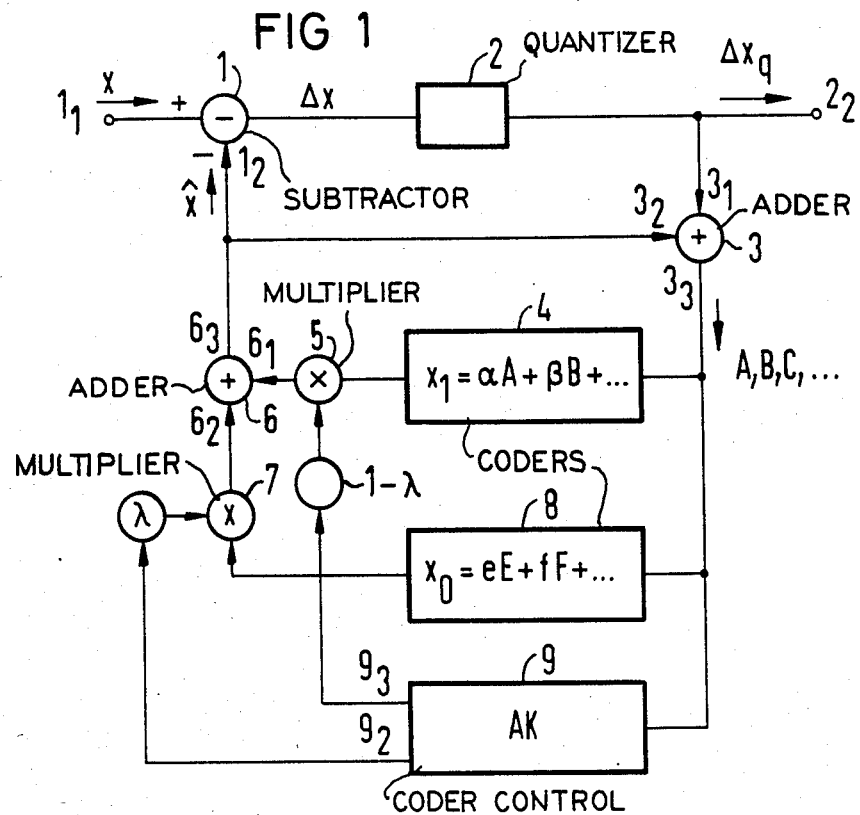
FIG 1
FIG 2
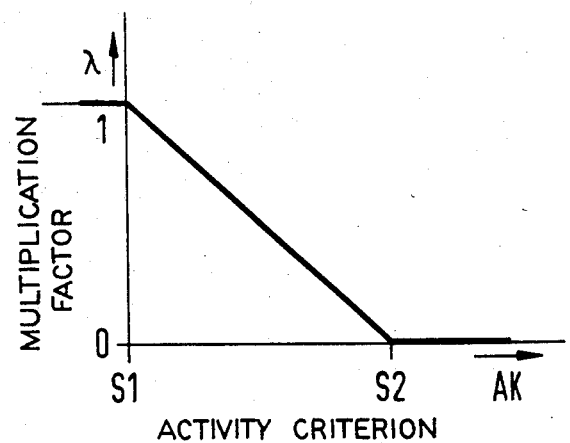
FIG 3

METHOD AND CIRCUIT ARRANGEMENT FOR THE IMPROVEMENT OF THE PICTURE QUALITY BY ACTIVITY-CONTROLLED DPCM CODING

BACKGROUND OF THE INVENTION

1. Field of the Invention

The present invention relates to a method for improving the picture quality of television signals given activity-controlled DPCM coding, wherein an estimated value for the determination of the DPCM signal of a value is calculated from the surrounding video signal values of the current sample and from the video values of the preceding television field surrounding this sample, wherein an activity criterion is identified from the video signal values of the same television field surrounding the current sample and from the video signal values of the preceding television field surrounding the current sample by calculating the amplitude differences, and wherein the estimated value from the video signal values and of the preceding television field is employed given an activity criterion below the first threshold. The invention also relates to a circuit arrangement for realizing the method of the invention.

2. Description of the Prior Art

The picture quality achieved with known DPCM methods is not always satisfactory at low transmission rates of, for example, 34 Mbit/s given two-dimensional calculation of the estimated value. An improvement can be achieved given standing images by the addition of video signal values of the preceding television field (interfield DPCM).

The coding dependent on the activity, i.e. on the contrast between mutually-corresponding picture points of chronologically-successive television signals was investigated in a CCIR document 11/CMTT of the CCIR Study Groups, in the period 1978-1982, Study Program 25A/11 (Mod I), "Getrennte Codierung von Farbfernsehsignalen mit 34 Mbit/s".

This proposed method requires a substantial expense for computation.

SUMMARY OF THE INVENTION

The object of the present invention is to provide a simply-realizable method for the improvement of picture quality given DPCM-coded television signals.

Proceeding from the initially mentioned art, the above object is achieved in that the estimated value from the video signal values of the current television field is employed given transgression of a second threshold by the amount of the activity criterion; in that, given an amount of the activity criterion between the two thresholds, the estimated value is calculated from the surrounding video signal values of the current television field and of the preceding television field; and in that the video signal values are multiplied by factors for the calculation of the activity criterion.

Given this method, a determination is first made as to whether successive television fields of a cutout under consideration differ from one another. When only small differences exist, then the determination of the estimated value, also referred to as a prediction value, occurs solely from the preceding television field. Given greater differences of intensity (amplitude differences) of neighboring video signal values of the current television field and of the preceding television field, the calculation of the estimated value occurs both from the preceding and the current television field. Given extremely high differences in intensity between successive television fields, the calculation of the estimated value occurs only from the current television field. The intensity differences are also referred to as activity.

It is thereby advantageous that a prediction value $x_0$ from the preceding television field and a second prediction value $x_1$ from the current television field are simultaneously calculated. Switching is undertaken between the two estimated values or a combination of both estimated values occur depending on the size of an activity criterion determined from successive television subfields.

The activity criterion can be determined by comparison of the spatially-adjacent video signal values, these corresponding to picture points, of the current television field and of the preceding television field, being determined by differential formation.

It is advantageous that the video signal values be multiplied by the factors $\frac{1}{2}^n$ for the calculation of the estimated value.

The calculation of the activity criterion becomes particularly simple when the respective signal value need only be divided by 2,4,8. This respectively means only the bitwise shift of the respective video signal value towards the right or, respectively, a corresponding type of connection.

It is advantageous that $$AK = |(\tfrac{1}{2}B + \tfrac{1}{4}C + \tfrac{1}{4}D) - \tfrac{1}{8}(\tfrac{1}{2}H + \tfrac{1}{2}I + \tfrac{1}{2}J + \tfrac{1}{2}K + \tfrac{1}{2}L + \tfrac{1}{2}M)|$$

is employed as the activity criterion.

The calculation of the activity criterion supplies sufficiently accurate results for the evaluation of the intensity differences of successive television fields. The use of the most recently-identified video signal value A has been omitted since there is only a short computation time available. The incorporation of the most recently-identified video signal value is, possible, however, when all arithmetic operations in which the video signal values, beginning with B participate are executed first and the most-recently identified image signal value is separately considered.

Given a prescribed value set of video signal values, it is advantageous that the first threshold value lies at $\frac{1}{8}$ and the second threshold value lies at $\frac{1}{4}$ of the value set.

The thresholds of 32 and 64 are easy to determine digitally. Given the prescribed value set of 256, these thresholds supply favorable results for the control of the coding.

It is advantageous that a sum $P = \tfrac{1}{2}B + \tfrac{1}{4}C + \tfrac{1}{4}D$ is respectively calculated from the current video signal values, that this sum is stored for nearly the duration of a field and is additionally stored by twice a television line, and the activity criterion and estimated value are calculated from the stored sums by multiplication of the factors $\frac{1}{4}$ and $\frac{1}{2}$.

A simple circuit structure is achieved as a result. Due to the delay, all required video signal values (A, B, C, D: E, F, G, H, ...) combined to form a sum are already present for the calculation of the activity criterion and of the estimated value.

BRIEF DESCRIPTION OF THE DRAWINGS

Other objects, features and advantages of the invention, its organization, construction and mode operation will be best understood from the following detailed description, taken in conjunction with the accompanying drawings, on which:

FIG. 1 is a schematic representation of a basic circuit diagram for the implementation of the method of the invention;

FIG. 2 is a representation of an excerpt or cut out from a television picture;

FIG. 3 is a graphic illustration of a characteristic for sliding coding;

DESCRIPTION OF THE PREFERRED EMBODIMENTS

Figure 4:
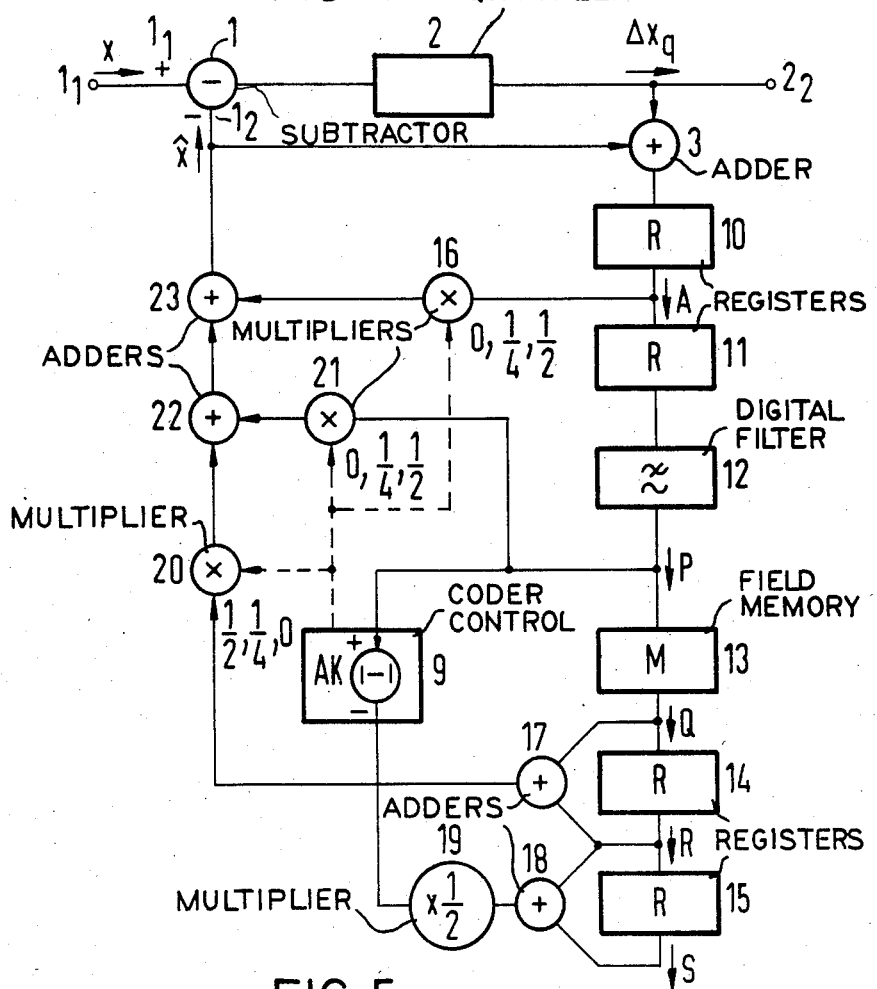
FIG. 4 is a schematic representation of a circuit arrangement for practicing the invention.

FIG. 1 illustrates a coding loop for three-dimensional coding, i.e. for a spatial and chronological coding. It comprises a subtractor 1 having an input $1_1$ by way of which the digitized samples x are supplied to the coding loop. The output of the subtractor 1 is connected to the input of a quantizer 2 whose output $2_2$ is connected to a first input $3_1$ of a first adder 3. Its output $3_3$ is connected to the input of a planar coder 4 and of an interfield coder 8. The output of the planar coder 4 is connected via a first multiplier 5 to a first input $6_1$ of a second adder 6. The output of the interfield coder 8 is connected via a second multiplier to the second input $6_2$ of the second adder 6. The output $6_3$ of the second adder 6 is connected to a second input $3_2$ of the first adder 3 and to a subtraction input $1_2$ of the subtractor 1. The first multiplier 5 works with a fixed factor $(1-\lambda)$. The second multiplier 7 multiplies the data output by the interfield coder 8 by the factor $\lambda$.

Up to this point, the coding loop exhibits no special characteristics. The samples x are compared to the calculated estimated value x and the differences of these two values $\Delta x$ is supplied to the quantizer 2 which emits the quantized DPCM signal $\Delta x_q$ at its output.

The estimated value x of the prediction value $$x_1 = \alpha A + \beta B + \gamma D + \delta D$$

and the prediction value $$x_0 = eE + fF + gG + hH + iI + jJ + kK + lL + mM$$

calculated by the interfield coder.

FIG. 2 illustrates a cutout from a television picture. The picture points which correspond to individual signal values of the current television field have been illustrated by thick strokes and fat letters. The corresponding picture points of the preceding television field have been marked by thin strokes and lean letters. In order for the decoder to make the same prediction as the coder, this may not calculate with the original samples but with the video signal values A, B, C . . . from the so-called local output $3_3$ of the first adder. The corresponding video signal values A, B, C, D and E through M are therefore entered in FIG. 2 instead of the preceding samples.

The coding loop according to FIG. 1 also comprises a coder control 9 which is operatively connected to the output $3_3$ of the adder 3. The factors $\lambda$ and $1-\lambda$ are determined via its outputs $9_2$ and $9_3$. The activity criterion $$AK = |\tfrac{1}{4}B + \tfrac{1}{2}C + \tfrac{1}{4}D) - \tfrac{1}{4}(\tfrac{1}{4}H + \tfrac{1}{4}I + \tfrac{1}{4}J + \tfrac{1}{4}K + \tfrac{1}{4}L + \tfrac{1}{4}M)|$$

is first identified in the coder control 9. For reasons of calculating speed, this occurs by way of a hardware circuit known per se. The multiplications by the factors $\tfrac{1}{2}$, $\tfrac{1}{4}$ and $\tfrac{1}{8}$ are realized by corresponding connections. Of course, it is not necessary to again store the video signal values in the coder control since this is already required in the planar coder and in the interfield coder. The coder control also contains a threshold circuit having two thresholds $S_1$ and $S_2$. When the identified activity criterion AK remains below the first threshold $S_1$, then the factor $\lambda = 1$ applies. This means nothing more than that the prediction value $x_0$ is employed as an estimated value $\hat{x}$. When an activity criterion between the two thresholds occurs, then $\lambda = \tfrac{1}{2}$ is selected. This means that both prediction values $x_0$ and $x_1$ equally contribute to the estimated value $\hat{x}$. When, however, the second threshold $S_2$ is transgressed by the activity criterion, then the factor $\lambda = 0$ is selected and, therefore, only the prediction value $x_1$ output by the planar coder is utilized for the calculation of the DPCM signal.

An interesting modification enables the sliding transition between the two types of coding as a function of the activity criterion. A corresponding characteristic is illustrated in FIG. 3. $\lambda = 1$ is illustrated before the first threshold; above the threshold, $\lambda$ decreases steadily up to the second threshold $S_2$ in order to remain at 0 after the transgression of the second threshold. The characteristic according to FIG. 3 can be approximated by way of a stepped function. The computational or, respectively, circuit expense becomes lower as a result. This modification produces another, slight improvement in the picture quality.

Figure 5:
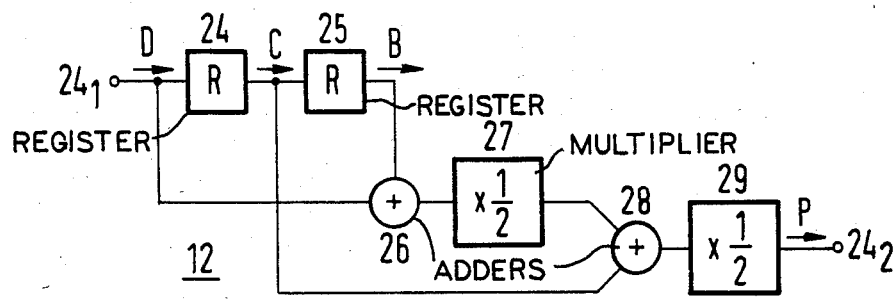
FIG. 5 is a schematic representation of a digital filter employed as an arithmetic circuit.

FIG. 4 illustrates a realizable circuit arrangement for $\lambda = 0$, $\tfrac{1}{2}$ and 1. Corresponding to FIG. 1, this circuit arrangement again contains the subtractor 1, the quantizer 2 and the first adder 3. The output of the adder 3 is connected by way of a first register 10 to a further line register 11 by way of which the video signal values are delayed by nearly one television line. The output of the line register 11 is connected to a digital filter 12 whose output is connected to a field memory 13, to the coder control 9 and to a third multiplier 21. Two further line registers 14 and 15, by way of which the adjacent signals are likewise delayed by a television line, are connected in series to the output of the field memory 13. The output of the field memory 13 and the output of the second line register 14 are combined by way of a third adder 17 whose output is connected to the subtraction input $1_2$ of the subtractor 1 via a second multiplier 20, a fourth adder 22 and a fifth adder 23. The output of the third multiplier 21 is connected to the second input of the fourth adder 22. A fourth multiplier 16 is connected between the output of the first register 10 and the second input of the fifth adder 23 whose output is also connected to the second input of the first adder 3. The output of the second line register 14 and the output of the third line register 15 are combined via a sixth adder 18 whose output is connected via a first multiplier 19 to a second input of the coder control 9. The control outputs of the coder control 9 act on the second multiplier 20, the third multiplier 21 and the fourth multiplier 16. As factors, 0, $\tfrac{1}{4}$ and $\tfrac{1}{2}$ may be set, respectively independently of one another. The fourth multiplier 16 is connected between the first register 10 and the second input of the adder 23. A product $$P = \tfrac{1}{4}B + \tfrac{1}{2}C + \tfrac{1}{4}D$$

is calculated by the digital filter 12. This moment is illustrated in FIG. 5. Due to the delay according to FIG. 4, $$Q = \tfrac{1}{4}E + \tfrac{1}{2}F + \tfrac{1}{4}G$$

then lies at the output of the field memory 13, $$R = \tfrac{1}{4}H + \tfrac{1}{2}I + 1/4J$$

lies at the output of the second line register 14, and $$S = \tfrac{1}{4}K + \tfrac{1}{2}L + \tfrac{1}{4}M$$

lies at the output of the third line register 15. These products are therefore respectively derived from a line of FIG. 2. The activity criterion is first determined in the coder control 9. Dependent thereon, the three multipliers 20, 21 and 16 are controlled such that the desired estimated value is respectively calculated, depending on the size of the activity criterion. When the activity criterion lies below the first threshold $S_1$, then the determination of the estimated value $\hat{x} = x_0$ occurs exclusively from the video signal value E–J of the most-recent television field. The multiplication factor of the fourth multiplier 16 and of the third multiplier 21 therefore become equal to zero, whereas the second multiplier multiplies its input values by $\tfrac{1}{2}$. The prediction value $a_0$ is thereby calculated as the estimated value.

When the first threshold $S_1$ is transgressed, then the multipliers 20, 21 and 16 multiply all input values by the factor $\tfrac{1}{4}$; when the second threshold is also transgressed, then the estimated value is calculated only from the video signal values of the current television field; the second multiplier 20 then multiplies its input values by the factor 0.

The multiplication by the factor $\tfrac{1}{2}$ only means a bit shift at the corresponding code word towards the right; a further shift by yet another bit occurs given the factor $\tfrac{1}{4}$. The multipliers are therefore realizable by way of simple switchovers. Given the factor 0, the outputs of the multipliers are placed at zero or a switch over to a prescribed potential occurs. The factor $\tfrac{1}{2}$ at the first multiplier 19 is already achieved by a corresponding bit-shifted connection at the adder 18; this multiplier is not required in the real structure of a circuit. The formation of the activity criterion AK likewise presents no difficulties. The value $\tfrac{1}{2}(R+S)$ is subtracted from the value P and, if necessary given a negative operational sign, the amount is formed (inverted).

The digital filter 12 illustrated in FIG. 5 comprises two further registers 24 and 25 connected in series which respectively effect a delay by one video signal value. The input $24_1$ of the first further register 24 and the output of the second further register 25 are combined via a seventh adder 26 followed by a multiplier 27. The output of the multiplier 27 and the output of the first further register 24 are combined via an eighth adder 28 whose output is connected to a following multiplier 29 whose output, in turn, forms the output $24_2$ of the digital filter. Both multipliers 27 and 29 multiplied by the factor 1/2. Given one realization, these multipliers are superfluous since the factor $\tfrac{1}{2}$ can be achieved by the corresponding connection at the further adders 26 and 28 which is respectively offset by one bit.

When one considers a point in time which corresponds to the point in time illustrated in FIG. 4, then is precisely the video signal values B, C and D that are processed by the digital filter. As one can easily see from this circuit, the value $$P = \tfrac{1}{4}B + \tfrac{1}{2}C + \tfrac{1}{4}D$$

occurs at the output.

The circuit expense remains low in that the same value P as already described with respect to FIG. 4 is further employed and is only evaluated with simple factors.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method for improving picture quality of television signals with activity-controlled DPCM coding, in which an estimated value (x) is calculated from the surrounding video signal values (A,B,C,D) of a current sample (x) and from the video signal values (E,F,G ... ) of the preceding television field which surround the sample (x) in which the activity criterion (AK) is determined from the video signal values (A,B,C,D) of the same television field which surround the current sample (x) and the video signal values (E,F,G ... ) of the preceding television field which surround the current sample (x) by calculating the amplitude differences, in which the activity criterion (AK) is employed given transgression thereof below a first threshold ($S_1$), the improvement therein comprising the steps of:
   applying an estimated value ($x=x_1$) for calculating the DPCM signal when the activity criterion transgresses a second threshold ($S_2$);
   calculating the estimated value from the surrounding video signal values (A,B,C,D; E,F,G ... ) of the current and preceding television frames when the activity criterion is between the first and second thresholds ($S_1 < AK < S_2$); and
   multiplying the video signal values (A,B,C,D; E,F,G ... ) by predetermined factors ($\alpha, \beta, \gamma, \ldots$; e,f,g ... ) ($\tfrac{1}{2}^n$) where n=1, 2,3,4 ... to calculate the activity criterion.

2. The improved method of claim 1, and further defined by the step of:
   multiplying the video signal values (A B,C,D; E,F,G ... ) by the factors $\tfrac{1}{2}^n$, where n=1,2,3, to obtain the estimated value.

3. The improved method of claim 2, comprising the step of:
   calculating the activity criterion as $AK = |(\tfrac{1}{4}B + \tfrac{1}{2}C + \tfrac{1}{4}D) - \tfrac{1}{2}(\tfrac{1}{4}H + \tfrac{1}{2}I + \tfrac{1}{4}J + \tfrac{1}{4}K + \tfrac{1}{2}L + \tfrac{1}{4}M)|$.

4. The improved method of claim 3, and further defined by the step of:
   setting the first and second thresholds at $\tfrac{1}{8}$ and $\tfrac{1}{4}$, respectively, of a 256 value set of the video signal values.

5. The improved method of claim 1, and further defined as:

calculating a first prediction value $x_0=\frac{1}{2}(\frac{1}{4}E+\frac{1}{2}F+\frac{1}{4}G+\frac{1}{4}H'\frac{1}{2}I+\frac{1}{4}J)$ when the activity criterion is below the first threshold; and calculating a second prediction value $x_1=\frac{1}{4}A+\frac{1}{4}B+\frac{1}{4}C+\frac{1}{4}D$ when the activity criterion is above the second threshold.

6. The improved method of claim 1, and further defined as:

calculating the prediction factor $\hat{x}=\frac{1}{2}(x_0+x_1)$ when the activity criterion is between the first and second thresholds.

7. The improved method of claim 1, and further defined as:

calculating the prediction factor $\hat{x}=\lambda x_0+(1-\lambda)x_1$ when the activity criterion is between the first and second thresholds, where $\lambda$ is a function of the activity criterion.

8. Apparatus for improving picture quality of television signals, comprising:

a subtractor including a first input for receiving television signal samples, a second input for receiving a prediction value, and an output;

a quantizer connected to said output and operable to provide quantized television signals;

a first adder including a first input connected to said quantizer, a second input for receiving the prediction value, and an output;

first and second serially-connected registers connected to said output of said first adder;

a digital filter connected to said second register;

a field memory connected to said digital filter;

third and fourth serially-connected registers connected to said field memory a second adder including first and second inputs respectively connected to the outputs of said third and fourth memories, and an output;

a coder control for producing multiplication factors connected to said digital filter;

a first multiplier connected between said output of said second adder and said coder control;

a third adder including first and second inputs respectively connected to the inputs of said third and fourth registers, and an output;

a second multiplier including a first input connected to said output of said second adder, a second input connected to said coder control to receive a multiplication factor, and an output;

a fourth adder including a first input connected to said first multiplier, a second input, and an output;

a fifth adder including a first input connected to said output of said fourth adder, a second input and an output connected to said second input of said subtractor and to said second input of said first adder;

a third multiplier including a first input connected to said output of said second multiplier, a second input connected to said coder control for receiving the multiplication factor, and an output; and a fourth multiplier including a first input connected to said coder control for receiving the multiplication factor, a second input connected to said first register, and an output connected to said second input of said fifth adder.

9. The apparatus of claim 8, wherein said digital filter comprises:

fifth and sixth serially connected registers, said fifth register connected to the output of said second register;

a sixth adder connected to the input of said fifth register and to the output of said sixth register;

a fifth multiplier connected to said sixth adder and operable to multiply by the factor $\frac{1}{2}$;

a seventh adder connected to the output of said fifth register and to said fifth multiplier; and a sixth multiplier, operable to multiply by the factor $\frac{1}{2}$, connected between said seventh adder and said field memory.

10. In a method for improving picture quality of television signals with activity-controlled DPCM coding, in which an estimated value (x) is calculated from the surrounding video signal values (A,B,C,D) of a current sample (x) and from the video signal values (E,F,G ...) of the next-to-last preceding television field which surround the sample (x) in which the activity criterion (AK) is determined from the video signal values (A,B,C,D) of the same television field which surround the current sample (x) and the video signal values (E,F,G ...) of the next-to-last preceding television field which surround the current sample (x) by calculating the amplitude differences, in which the activity criterion (AK) is employed given transgression thereof below a first threshold ($S_1$), the improvement therein comprising the steps of:

applying an estimated value ($\hat{x}=x_1$) for calculating the DPCM signal when the activity criterion transgresses a second threshold ($S_2$);

calculating the estimated value from the surrounding video signal values (A,B,C,D; E,F,G ...) of the current and next-to-last preceding television frames when the activity criterion is between the first and second thresholds ($S_1<AK<S_2$); and multiplying the video signal values (A,B,C,D; E,F,G ...) by predetermined factors $\alpha,\beta,\gamma,...$; e,f,g ...) ($\frac{1}{2}^n$) where n=1, 2, 3, 4 ... to calculate the activity criterion.

* * * * *